United States Patent [19]

Iwata et al.

[11] Patent Number: 5,179,977
[45] Date of Patent: Jan. 19, 1993

[54] FLOW CONTROL DEVICE

[75] Inventors: Kouichi Iwata; Katsuyoshi Fukaya, both of Oobu, Japan

[73] Assignee: Aisan Kogyo Kabushiki Kaisha, Japan

[21] Appl. No.: 649,662

[22] Filed: Feb. 1, 1991

[30] Foreign Application Priority Data

Feb. 20, 1990 [JP] Japan .................................. 2-15794
Apr. 6, 1990 [JP] Japan .................................. 2-37501

[51] Int. Cl.⁵ ............................................. F16K 11/04
[52] U.S. Cl. ............................. 137/625.5; 251/129.11
[58] Field of Search ......... 137/625.5, 625.48, 625.34; 251/129.11

[56] References Cited

U.S. PATENT DOCUMENTS

| | | | |
|---|---|---|---|
| 2,731,036 | 1/1956 | Hughes | 137/625.34 |
| 3,123,091 | 3/1964 | Elsey | 137/625.34 X |
| 3,495,623 | 2/1970 | Jespersen | 137/625.5 X |
| 4,250,920 | 2/1981 | Traylor | 137/625.5 X |
| 4,287,915 | 9/1981 | Hoffmann et al. | 137/625.5 |
| 4,314,585 | 2/1982 | Nishimiya et al. | 137/625.34 |
| 4,586,538 | 5/1986 | Niskanen | 137/625.5 |

Primary Examiner—Arnold Rosenthal

[57] ABSTRACT

A flow control device wherein an operating shaft having two valve bodies is actuated by a single stepping motor to control the flow rate of fluid flowing through at least two by-pass passages. A portion of the operating shaft is supported by a first bearing member located in a boundary portion between a casing with the stepping motor incorporated therein and an air dispensing housing, and the shaft portion of the operating shaft located between the two valve bodies is supported by a second bearing member disposed in the interior of the housing. The two valve bodies are centrally provided with axial holes, through which is inserted the operating shaft to fix the valve bodies replaceably. The second bearing member is formed in the shape of a bottomed cylinder having a flange portion at a free end of the cylindrical portion, and at this flange portion the second bearing member is held between the casing and the housing together with the first bearing member. And a valve seat which controls the flow rate of air in cooperation with one of the two valve elements is supported replaceably by the cylindrical portion of the second bearing member.

9 Claims, 4 Drawing Sheets

FLOW CONTROL DEVICE

BACKGROUND OF THE INVENTION

1. Field of the Invention

The present invention relates to a flow control device and more particularly to a flow control device for controlling the flow rate of air passing through a by-pass air passage in an intake system of an internal combustion engine.

2. Description of the Prior Art

Heretofore, in flow control devices of this type there has been used a stepping motor 10 as an actuator, as shown in FIG. 1. With forward and reverse rotations of a rotor 16 of the motor 10, a shaft 80 reciprocates along the axis thereof.

A front end portion of the shaft 80 is positioned within a by-pass air passage 81, and a valve body 82 is provided on the shaft. The valve body 82 moves in contact with or away from a valve seat 83 provided in the passage 81 in accordance with a reciprocating motion of the shaft 80. With this movement of the valve body 82, the flow path area of the passage 81 increases or decreases to control the amount of air to be supplied.

In the case where two or more by-pass passages are required for the internal combustion engine and the flow rate of air in these by-pass passages are required to control synchronously, it is necessary to provide a plurality of flow control devices in such a number as the number of by-pass passages.

Furthermore, in the case where each of the flow control devices has different operative features with each other, the time necessary to actuate the valve body of each of the flow control devices after an electric signal is fed to the stepping motor differs with each other, resulting in that synchronous actuation of all the flow control devices is deteriorated.

SUMMARY OF THE INVENTION

It is a primary object of the present invention to provide a flow control device having at least two valve bodies mounted on a single operating shaft which is actuated by a single actuator, the flow control device being capable of controlling the flow rate of fluid flowing each of two or more fluid passages synchronously. It is another object of the present invention to provide a flow control device which is capable of suppressing the vibration of the operating shaft, and thereby preventing a change in the flow rate of by-pass air caused by abrasion of the valve bodies or valve seats.

It is still another object of the present invention to provide a flow control device easy to be assembled mounted and capable of diversifying flow characteristics by replaceably fixing at least two valve bodies to a shaft which is operated by an actuator.

According to the present invention, an operating shaft provided with two valve bodies axially in spaced relation to each other is projected from a casing in which an actuator is incorporated, and is actuated by the actuator for axial reciprocation within a fluid dispensing housing. Said housing is fixed to said casing and accommodates the operating shaft in the internal space thereof. The housing has two fluid outlet ports spacedly in the axial direction of the operating shaft and also has one fluid inlet port. In a boundary portion between the casing and the housing, there is disposed a first bearing member for supporting the operating shaft slidably in the axial direction thereof, while a second bearing member is disposed within the housing for supporting the shaft portion located between the two valve bodies provided on the operating shaft slidably in the axial direction. Within the housing and between the fluid inlet port and the first fluid outlet port, there is provided a first valve seat for controlling the flow rate of fluid in cooperation with the first valve body provided on the operating shaft, while between the fluid inlet port and the second fluid outlet port, there is provided a second valve seat for controlling the flow rate of fluid in cooperation with the second valve body provided on the operating shaft. In the second bearing member, there is formed a through hole so that the fluid introduced from the fluid inlet port can flow though the two by-pass passages defined by the bearing member.

According to the present invention, the operating shaft actuated by the actuator is supported by both the first bearing member disposed in the boundary portion between the casing incorporating the actuator therein and the fluid dispensing housing and the second bearing member disposed between said two valve bodies in the housing, so that even if the operating shaft is lengthened as a result of provision of the two valve bodies thereon, the vibration of the shaft is suppressed and the repeated contact of the valve bodies with the valve seats due to the vibration is prevented. Consequently, it is possible to prevent a change in the flow rate caused by the abrasion of the valve bodies or valve seats.

In a further aspect of the present invention, one of the two valve seats is fixed by being pressed into the second bearing member which is fixed to both the casing and the housing, thereby allowing the replacement thereof. It is also possible to make replacement of the two valve bodies provided on the operating shaft. Not only assembling of a flow control device having two by-pass passages is facilitated, but also it is possible to easily exchange one valve seat and both valve bodies for those different in size, when it is necessary to change the by-pass flow rate.

BRIEF DESCRIPTION OF THE DRAWINGS

Various other objects, features and attendant advantages of the present invention will be more fully appreciated as the same becomes better understood from the following detailed description when considered in connection with the accompanying drawings in which like reference characters designate like or corresponding parts through the several views and wherein.

DETAILED DESCRIPTION OF THE PREFERRED EMBODIMENTS

Figure 1:
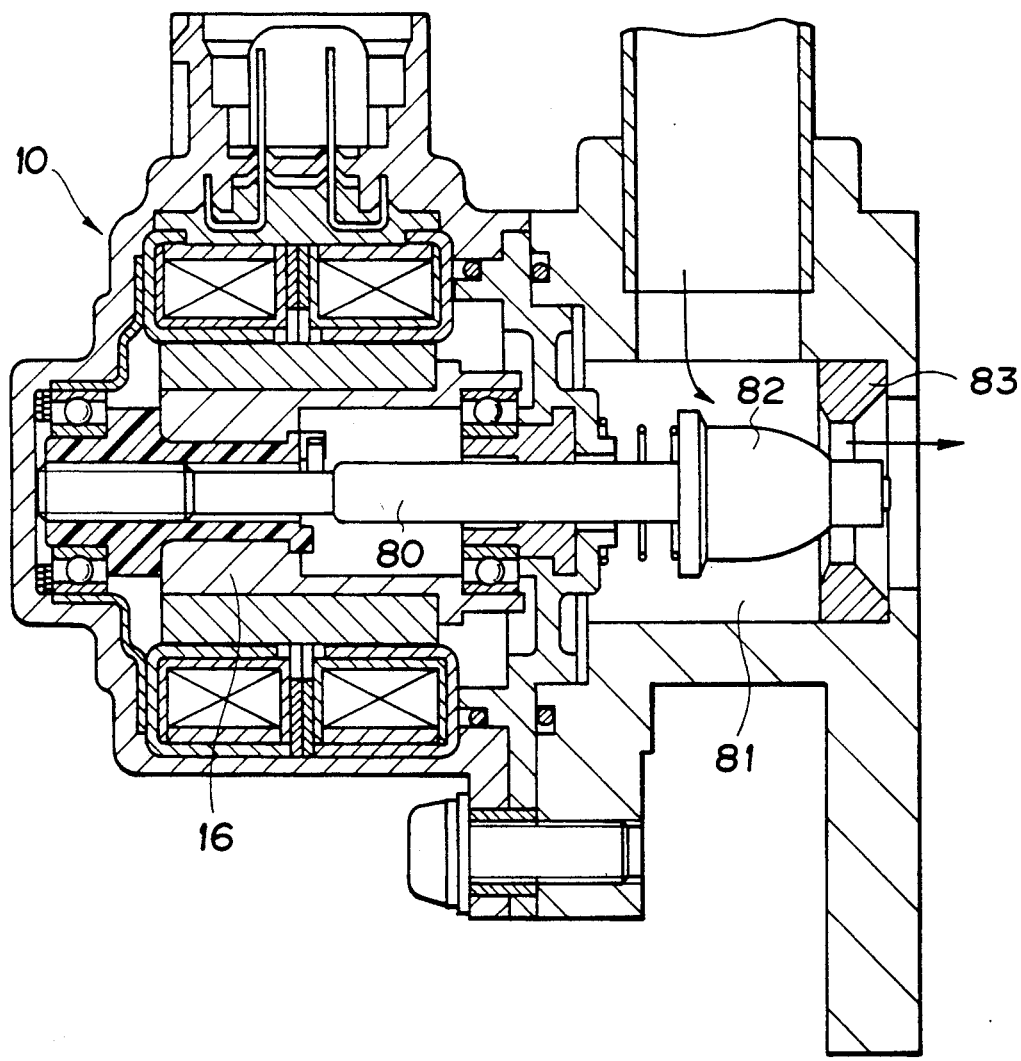
FIG. 1 is a sectional side view of a conventional flow control device.
Figure 2:
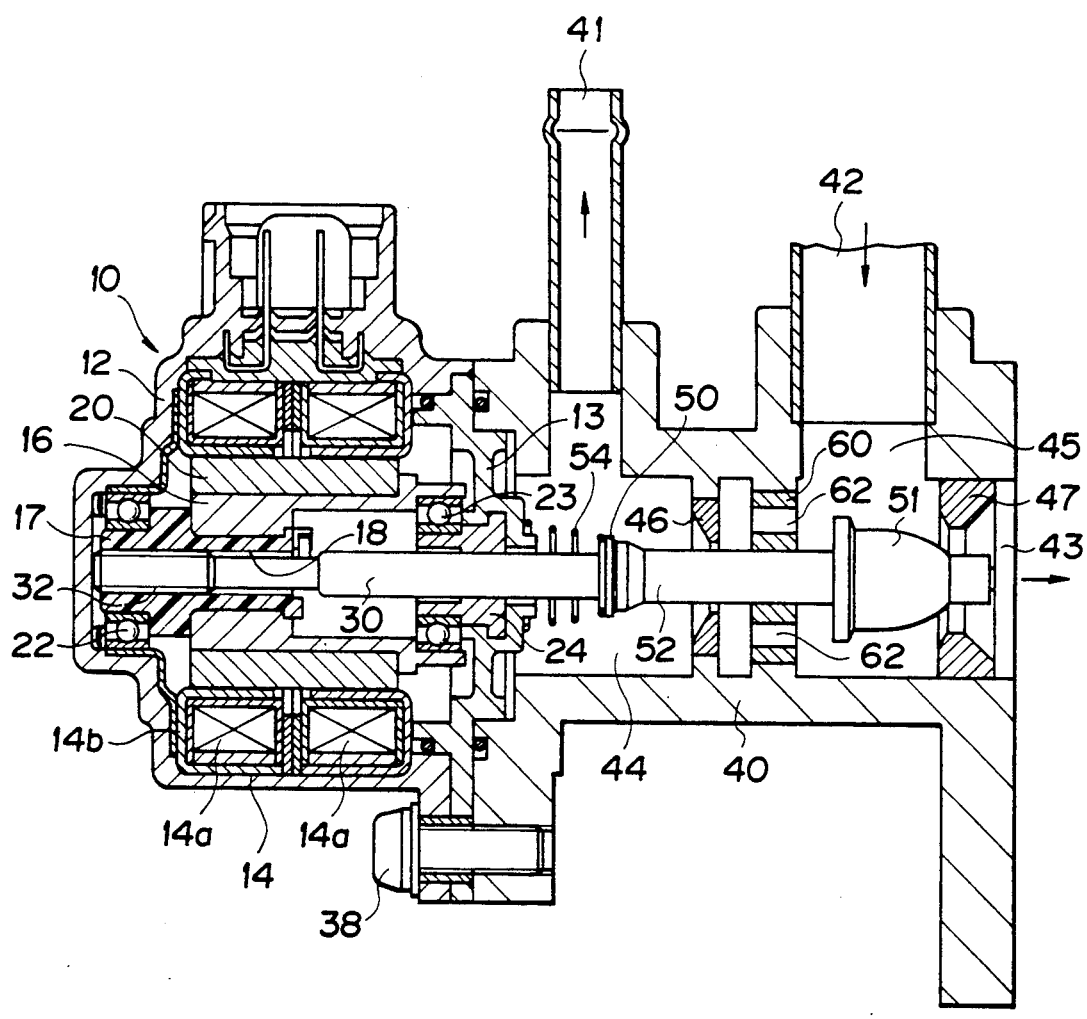
FIG. 2 is a sectional side view of an embodiment according to the present invention.
Figure 3:
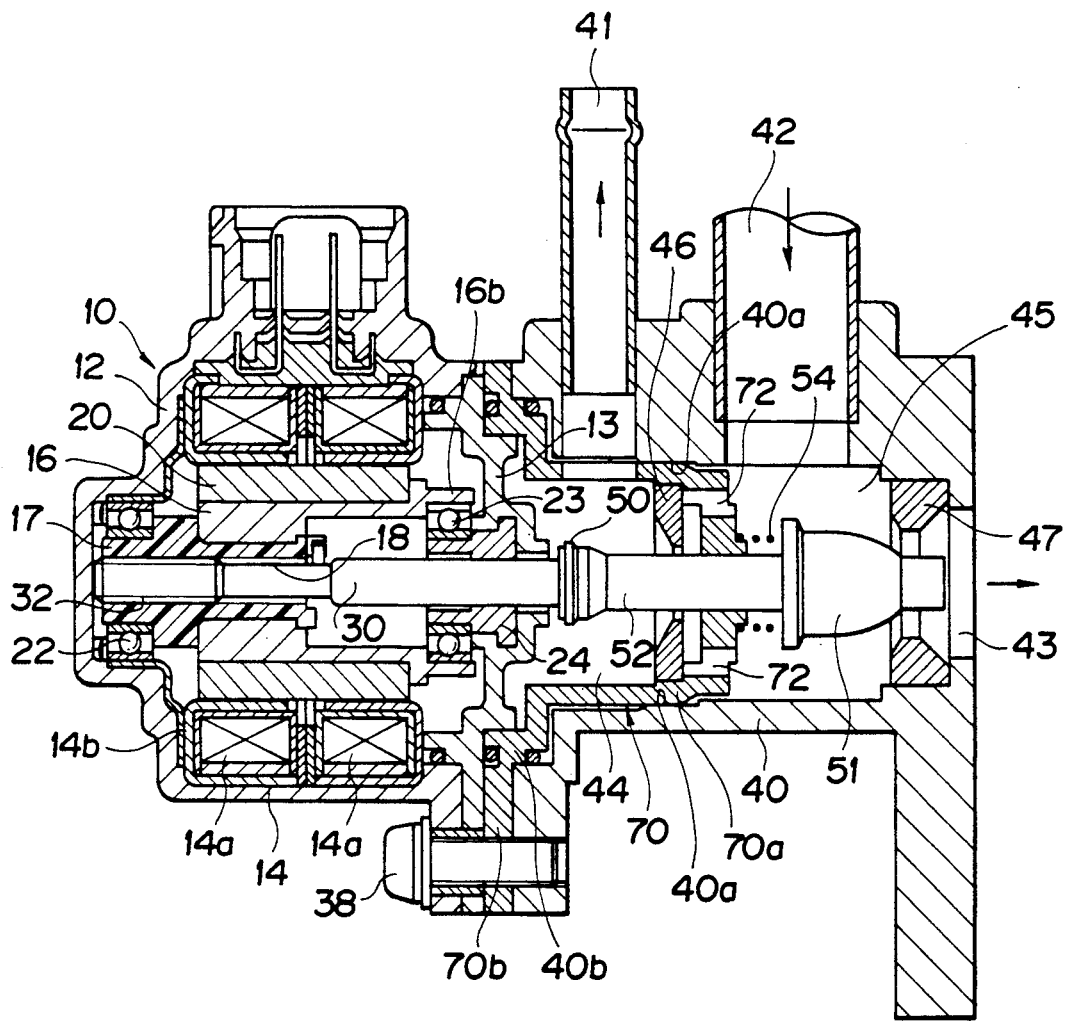
FIG. 3 is a sectional side view of another embodiment according to the present invention.
Figure 4:
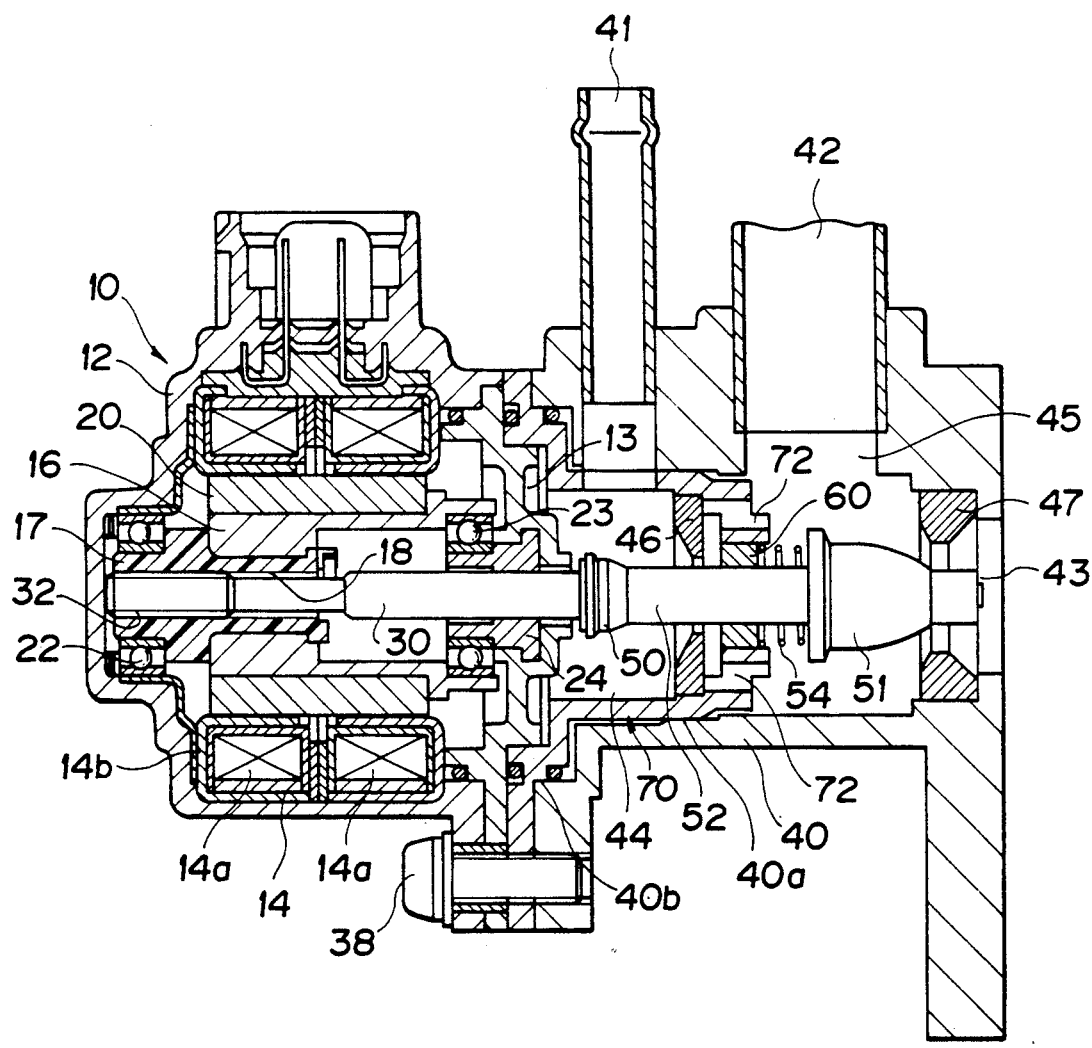
FIG. 4 is a sectional side view of a further embodiment according to the present invention.

FIGS. 2, 3 and 4 illustrate embodiments where a flow control device according to the present invention is applied to an idling revolution control system in an internal combustion engine.

In FIG. 2, a stepping motor 10 as an actuator is provided with a stator 14 incorporated in the interior of a motor casing 12 and a rotor 16 accommodated rotatably in a hollow portion of the stator 14. An opening of the motor casing 12 shown on the right-hand side in the figure is closed with a plate 13 after the stator 14 and the rotor 16 were mounted in the interior of the motor casing 12.

The stator 14 comprises a ring-like exciting coil 14a and a magnetic pole 14b. The rotor 16 is provided with a cylindrical magnet 20 provided on the outer periphery thereof and a cylindrical supporting member 17 fitted in a central hole on the left-hand side in the figure. The magnet 20 has a plurality of north and south magnetic poles magnetized alternating on an outer periphery thereof.

The outer periphery of the supporting member 17 and the inner periphery of a sleeve portion of the rotor 16 positioned on the right-hand side in the figure are supported rotatably to the motor casing 12 by ball bearings 22 and 23, respectively. As to the left-hand ball bearing 22, the outer race thereof is supported by the motor casing 12, while as to the right-hand ball bearing 23, the inner race thereof is supported by a sliding bearing 24 mounted on the plate 13 which is described later.

An operating shaft 30 is provided through the rotational center of the rotor 16. External threads 32 are formed on the outer peripheral portion of the operating shaft 30 near the left end in the figure and are threadedly engaged with internal threads 18 formed on the inner periphery of the central hole of the supporting member 17. Both threads 18 and 32 function as feed screws, and the operating shaft 30 is baffled on the motor casing 12 side by a means (not shown), so that with forward and reverse rotations of the rotor 16, the operating shaft 30 is not allowed to rotate together with the rotor 16 and only slides in the right and left directions in FIG. 2 along the axis thereof.

The operating shaft 30 extends rightwards in FIG. 2 from the interior of the motor casing 12 through the plate 13. A portion of the shaft 30 is supported slidably by the sliding bearing 24 which is fixed to the plate 13.

The motor casing 12 is connected to a housing 40 with bolts 38 through the plate 13, where the housing 40 constitutes a by-pass air passage in an engine intake system. The housing 40 has an air inlet port 42 and two air outlet ports 41 and 43, and two by-pass spaces 44 and 45 are formed in the interior of the housing 40. The operating shaft 30 extends through both by-pass spaces 44 and 45 and is positioned therein. Further, in the by-pass spaces 44 and 45 there are disposed valve seats 46 and 47 having an opening, respectively, formed concentrically with the shaft 30.

Valve bodies 50 and 51 opposed to the valve seats 46 and 47, respectively, are fixed onto the portions of the operating shaft 30 positioned within the by-pass spaces 44 and 45 in a manner described later. The valve bodies 50 and 51 are adapted to move close to and away from the openings provided on the valve seats 46 and 47, respectively, to control the flow rate of by-pass air passing through the openings of those valve seats 46 and 47, respectively. The air enters from the air inlet port 42 and flows toward the air outlet ports 41 and 43, respectively, as indicated by arrows in the figure.

The valve bodies 50 and 51 are disposed at a predetermined interval along the axis of the operating shaft 30 with each other by a shaft portion 52 having a predetermined length. The shaft portion 52, that is, the shaft portion located between both valve bodies 50 and 51, is supported slidably with respect to a portion of the housing 40 by a sliding bearing member 60. A plurality of through holes 62 are formed in the bearing member 60.

Between the plate 13 of the motor casing 12 and an end face of the valve body 50 is interposed a conical spring 54 which is concentric with the operating shaft 30. The resilience of the spring 54 functions to suppress an axial "wobbling" when the shaft 30 slides as described previously.

In the flow control device having the above-noted construction, when an electric signal from an engine controller (not shown) is fed to the coil 14a of the stator 14 in the stepping motor 10, the rotor 16 rotates normally or reversely in accordance with the signal. As a result, the operating shaft 30 reciprocates in the right and left directions in FIG. 2 together with the valve bodies 50 and 51.

More particularly, when the rotor 16 rotates to move the operating shaft 30 rightwards in FIG. 2, the valve bodies 50 and 51 approach the respective valve seats 46 and 47, so that the flow path area of by-pass air flowing through each of the by-pass spaces 44 and 45 decreases gradually. When the delivery of the shaft 30 becomes maximum, the valve bodies 50 and 51 are come into contact with the respective valve seats 46 and 47, to close the openings to isolate the by-passes spaces 44 and 45.

Upon reverse rotation of the rotor 16, the valve bodies 50 and 51 move away from the openings in the valve seats 46 and 47, respectively, so that the flow path area of the by-pass air flowing through each of the by-pass spaces 44 and 45 increases gradually.

Since the two valve bodies 50 and 51 are provided on the operating shaft 30, the shaft 30 is lengthened accordingly. However, the shaft 30 on which the valve bodies 50 and 51 are provided are supported at two portions, one of which corresponds to the portion slidably supported by the sliding bearing 24 mounted to the plate 13 located at the boundary portion between the motor casing 12 and the housing 40, and the other corresponds to the shaft portion 52 located between the valve bodies 50 and 51 and slidably supported by the sliding bearing member 60 mounted in the housing 40. Consequently, the vibration of the operating shaft 30 and the valve bodies 50, 51 are suppressed even when vibrations are applied from the exterior to the flow control device, whereby a repeated contact of the valve bodies 50 and 51 with the valve seats 46 and 47 due to the vibration is prevented.

Although the supporting member 17 for the rotor 16 is generally made of a synthetic resin, the durability of the internal threads 18 is improved because the vibration of the operating shaft 30 screwed with the internal threads 18 is suppressed.

The embodiment illustrated in FIG. 3 is different from the embodiment shown in FIG. 2 in that the valve seat 46 positioned within the by-pass space 44 is held by a valve seat guide member 70 which is supported by a flange portion 70b fixed between the motor casing 12 and the housing 40. The valve seat guide member 70 is adapted for positioning the valve seat 46 with respect to the valve body 50, and it comprises a bottomed, cylindrical body portion 70a and the flange portion 70b. The valve seat 46 is fixed by being pressed into the body portion 70a of the valve seat guide member 70.

A cylindrical opening concentric with the operating shaft 30 is formed in a supporting portion, that is the bottom of the body portion 70a and it functions as a sliding bearing member for supporting the shaft portion 52 located between the valve bodies 50 and 51.

Also, through holes 72 which provide communication between the by-pass spaces 44 and 45 are formed in the bottom of the body portion 70a.

The outer periphery of the body portion 70a is supported in uniform contact with a guide receptacle 40a formed on the inner wall surface of the housing 40, and a portion of the outer periphery of the flange portion 70b is supported in uniform contact with an inner wall end face 40b of the housing 40, to the extent of not causing "wobbling," whereby the movement of the valve seat guide member 70 is restricted in a direction perpendicular to the operating shaft 30.

Further, the flange portion 70b of the valve seat guide member 70 is fixed between the motor casing 12 and the housing 40 with bolts 38 together with the plate 13. Consequently, the axial movement of the valve seat guide member 70 is also restricted in the interior of the housing 40. In this state, the valve seat guide member 70 is accommodated in the interior of the housing 40.

In the above-noted construction, because of the valve seat 46 is fixed by being pressed into the valve seat guide member 70, the vertical and axial movements with respect to the operating shaft 30 can be restricted, resulting in accurate positioning. However, the valve seat guide member 70 is not directly fixed to the inner wall surface of the housing 40 and can be removed by removing the bolts 38.

Between the supporting portion, bottom of the body portion 70a of the valve seat guide member 70 and the left end face of the valve body 51, there is interposed a conical spring 54 concentrically with the operating shaft 30. The resilience of the spring 54 functions to suppress an axial "wobbling" when the operating shaft 30 slides as described previously.

Other constructional points are the same as in the embodiment illustrated in FIG. 2. Therefore, the same portions are indicated by the same reference numerals and explanations thereof are omitted.

In the embodiment illustrated in FIG. 4, the sliding bearing member 60 which supports the shaft portion 52 provided on the operating shaft 30 and located between the valve bodies 50 and 51 is held by being pressed into a hole formed in the supporting portion, bottom of the body portion 70a of the valve seat guide member 70 having through holes 72 therein. Other constructional points are the same as in the embodiment illustrated in FIG. 3.

Figure 5:
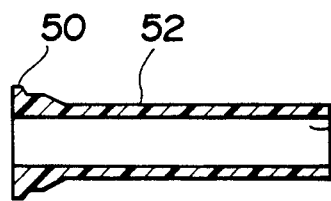
FIGS. 5 and 6 are sectional views each showing a valve body used in the flow control device according to the present invention.
Figure 6:
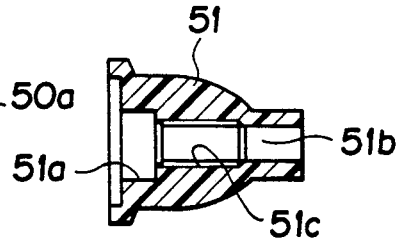

Referring now to FIGS. 5 and 6, the valve bodies 50 and 51 capable of being mounted replaceably onto the operating shaft 30 are shown in section.

As shown in FIG. 5, the valve body 50 is a hollow member formed integrally with the shaft portion 52 which is in the shape of a hollow cylinder, with an axial bore 50a being formed through the center axes of both the valve body 50 and the shaft portion 52. The valve body 51 is also formed as a hollow member, having at one end thereof a cylindrical hole 51a, into which an end portion of the shaft portion 52 is tightly fitted, and an axial bore 51b connected to the hole 51a. The axial bore 51b is partially formed with an internal thread 51c.

For fixing the valve bodies 50 and 51 to the operating shaft 30, a small-diameter portion which is to be fitted tightly into the axial bore 50a of the valve body 50 and having a threaded portion in engagement with the internal thread 51c of the valve body 51 is formed on the operating shaft 30, and then, the small-diameter portion of the shaft 30 is inserted into the axial bore 50a of the valve body 50 and thereafter the axial bore 51b of the valve body 51, so as to insert the end portion of the shaft portion 52 into the cylindrical hole 51a of the valve body 51, causing the internal thread of the valve body 51 to be come into engagement with the threaded portion provided on the small-diameter portion of the shaft 30. This is advantageous in that the mounting of the valve bodies 50 and 51 to the flow control device becomes easier and that it becomes possible to replace the valve body 50 and/or the valve body 51 with one different in size.

When the operating shaft 30 with the valve body 50 and/or the valve body 51 mounted thereon is used in the embodiment illustrated in FIGS. 3 or 4 and when there arises the necessity of changing the distribution of the amount of the air flowing through the by-pass space 44, this necessity can be satisfied by exchanging the valve body 50 and the valve seat 46 for those of different sizes, and thus it is possible to cope with the diversification of flow characteristics flexibly.

What is claimed is:

1. A flow control device comprising:
a casing with an actuator incorporated therein;
an operating shaft projected from said casing and actuated for axial reciprocation by said actuator, said operating shaft having a first and a second valve bodies mounted axially spaced from each other;
a fluid dispensing housing fixed to said casing and having an inner space in which said operating shaft is accommodated, said fluid dispensing housing having a first and a second fluid outlets spacedly from each other in the axial direction of said operating shaft and further having one and single fluid inlet;
a first valve seat provided between the fluid inlet and the first fluid outlet in said housing and functioning to control the flow rate of fluid flowing from said fluid inlet toward said first fluid outlet in cooperation with the first valve body mounted on said operating shaft;
a second valve seat provided between the fluid inlet and the second fluid outlet in said housing and functioning to control the flow rate of fluid flowing from said fluid inlet toward said second fluid outlet in cooperation with the second valve body mounted on said operating shaft; and
said first valve seat and said second valve seat being positioned to come into contact with said first valve body and said second valve body, respectively, by movement of said operating shaft in one axial direction thereof, whereby, fluid flow flowing out of said fluid dispensing housing through said first fluid outlet and said second fluid outlet is simultaneously increased and decreased depending on the direction of the movement of said operating shaft.

2. A flow control device according to claim 1, wherein said two valve bodies are each provided with an axial bore into which said operating shaft is fitted, and said operating shaft is inserted through said axial bores to fix the valve bodies thereon.

3. A flow control device according to claim 1, wherein one of said two valve bodies has a valve element and a shaft portion formed integrally with each other and having an axial bore into which said operating shaft is fitted, and the other valve body has a valve element and an axial bore into which said operating shaft is fitted and also has a hole for fitting therein and connection thereto of an end portion of said shaft portion.

4. A flow control device including:
   a casing with an actuator incorporated therein;
   an operating shaft projected from said casing and actuated for axial reciprocation by said actuator, said operating shaft having a first and a second valve bodies mounted axially spaced from each other;
   a fluid dispensing housing fixed to said casing and having an inner space in which said operating shaft is accommodated, said fluid dispensing housing having a first and a second fluid outlets spacedly from each other in the axial direction of said operating shaft and further having one and single fluid inlet in the intermediate position between said fluid outlets;
   a first bearing member disposed in a boundary portion between said casing and said housing for slidably supporting said operating shaft;
   a second bearing member disposed within said housing for slidably supporting a portion of said operating shaft located between the two valve bodies, said second bearing member having a through hole formed therein for allowing fluid flowing therethrough;
   a first valve seat provided between the fluid inlet and the first fluid outlet in said housing and functioning to control the flow rate of fluid flowing from said fluid inlet toward said first fluid outlet in cooperation with the first valve body mounted on said operating shaft;
   a second valve seat provided between the fluid inlet and the second fluid outlet in said housing and functioning to control the flow rate of fluid flowing from said fluid inlet toward said second fluid outlet in cooperation with the second valve body mounted on said operating shaft; and
   said first valve seat and said second valve seat being positioned to come into contact with said first valve body and said second valve body, respectively, by movement of said operating shaft in one axial direction thereof, whereby, fluid flow flowing out of said fluid dispensing housing through said first fluid outlet and said second fluid outlet is simultaneously increased and decreased depending on the direction of the movement of said operating shaft.

5. A flow control device according to claim 4, wherein peripheral edge of said first bearing member is held between said casing and said housing.

6. A flow control device according to claim 4, wherein said second bearing member comprises a cylindrical portion, a supporting portion at an axial end of said cylindrical portion for slidably supporting said operating shaft and a flange portion formed at the other axial end of said cylindrical portion, said second bearing member is supported in said housing with said flange portion being held between and fixed to said housing and said casing and said supporting portion being provided with a through hole for allowing fluid flowing therethrough.

7. A flow control device according to claim 4, wherein said two valve bodies are each provided with an axial bore into which said operating shaft is fitted, and said operating shaft is inserted through said axial bores to fix the valve bodies thereon.

8. A flow control device including:
   a casing with an actuator therein;
   an operating shaft projected from said casing and actuated for axial reciprocation by said actuator, said operating shaft having two valve bodies mounted axially spaced from each other;
   a fluid dispensing housing fixed to said casing and having an inner space in which said operating shaft is accommodated, said fluid dispensing housing having two fluid outlets spacedly from each other in the axial direction of said operating shaft and further having a fluid inlet in the intermediate position between said fluid outlets;
   a first bearing disposed in a boundary portion between said casing and said housing for slidably supporting said operating shaft;
   a second bearing member disposed within said housing for slidably supporting a portion of said operating shaft located between the two valve bodies, said second bearing member having a through hole formed therein for allowing fluid flowing therethrough;
   a first valve seat provided between the fluid inlet and the first fluid outlet in said housing and functioning to control the flow rate of fluid in cooperation with the first valve body mounted on said operating shaft; and
   a second valve seat provided between the fluid inlet and the second fluid outlet in said housing and functioning to control the flow rate of fluid in cooperation with the second valve body mounted on said operating shaft; and wherein
   one of said two valve bodies has a valve element and a shaft portion formed integrally with each other and having an axial bore into which said operating shaft is fitted, and the other valve body has a valve element and an axial bore into which said operating shaft is fitted and also has a hole for fitting therein and connection thereto of an end of said shaft portion, said shaft portion being supported by said second bearing member.

9. A flow control device comprising:
   a casing with an actuator incorporated therein;
   an operating shaft projected from said casing and actuated for axial reciprocation by said actuator, said operating shaft having a first and a second valve bodies mounted axially spaced from each other;
   a fluid dispensing housing fixed to said casing and having an inner space in which said operating shaft is accommodated, said fluid dispensing housing having a first and a second fluid outlets spacedly from each other in the axial direction of said operating shaft and communicating said inner space of said fluid dispensing housing with outside of said fluid dispensing housing, respectively, and further having one and single fluid inlet;
   a first valve seat provided between the fluid inlet and the first fluid outlet in said housing and functioning to control the flow rate of fluid flowing from said fluid inlet toward said first fluid outlet in cooperation with the first valve body mounted on said operating shaft;
   a second valve seat provided between the fluid inlet and the second fluid outlet in said housing and functioning to control the flow rate of fluid flowing from said fluid inlet toward said second fluid outlet in cooperation with the second valve body mounted on said operating shaft; and said first valve seat and said second valve seat being positioned to come into contact with said first valve body and said second valve body, respectively, by movement of said operating shaft in one axial direction thereof, whereby, fluid flow flowing out of said fluid dispensing housing through said first fluid outlet and said second fluid outlet separately with each other is simultaneously increased and decreased depending on the direction of the movement of said operating shaft.

* * * * *